United States Patent Office 2,847,094
Patented Aug. 12, 1958

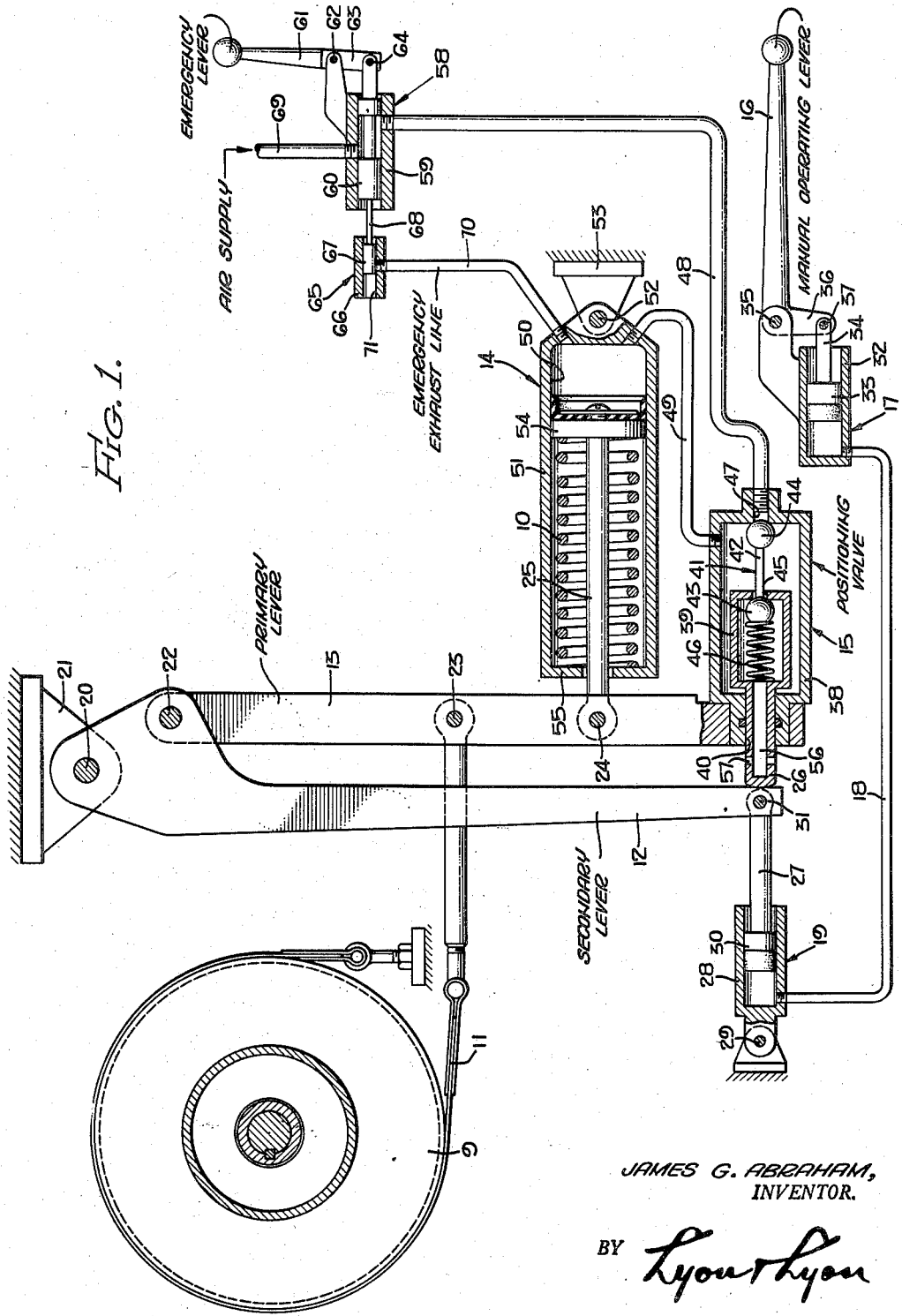

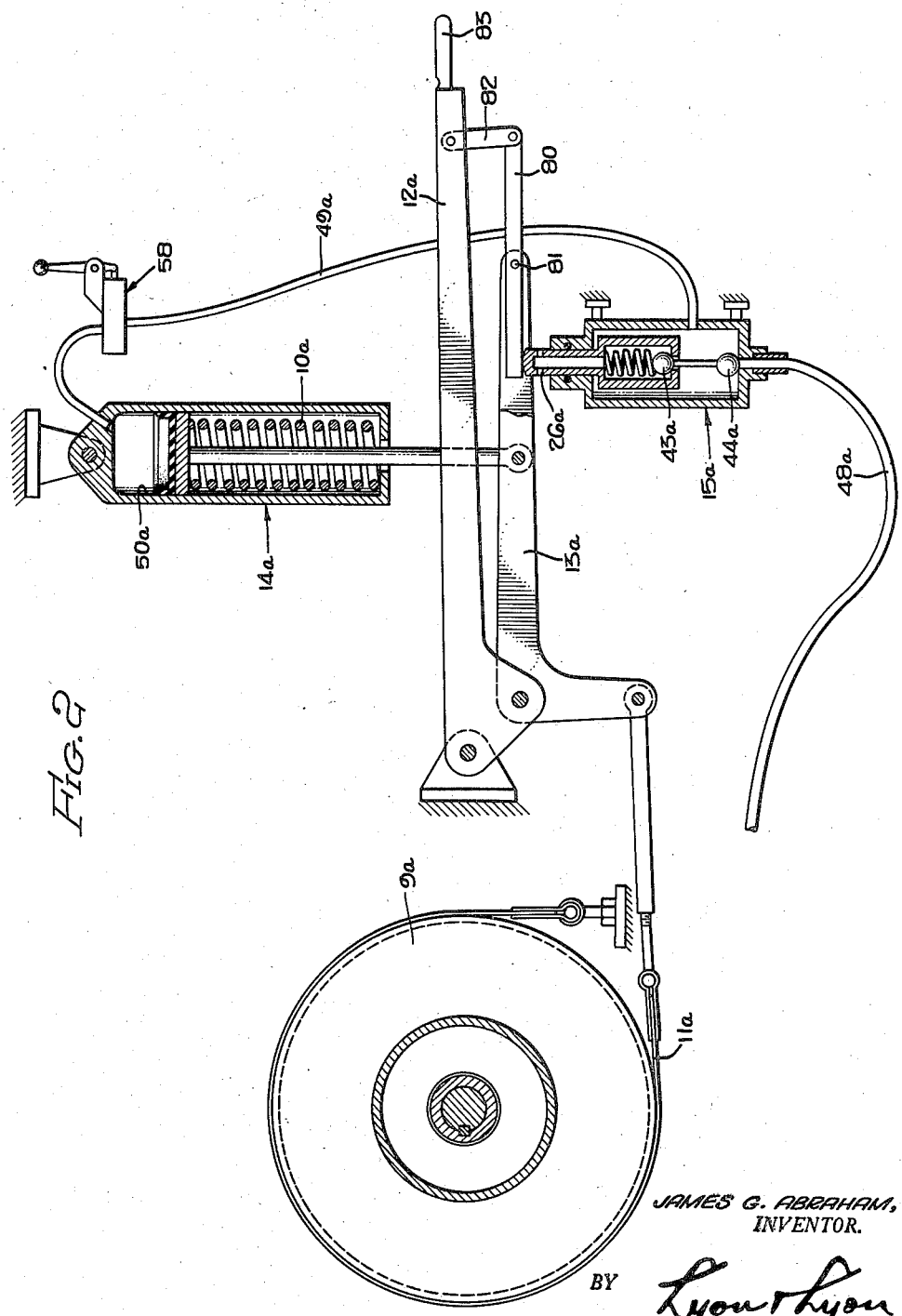

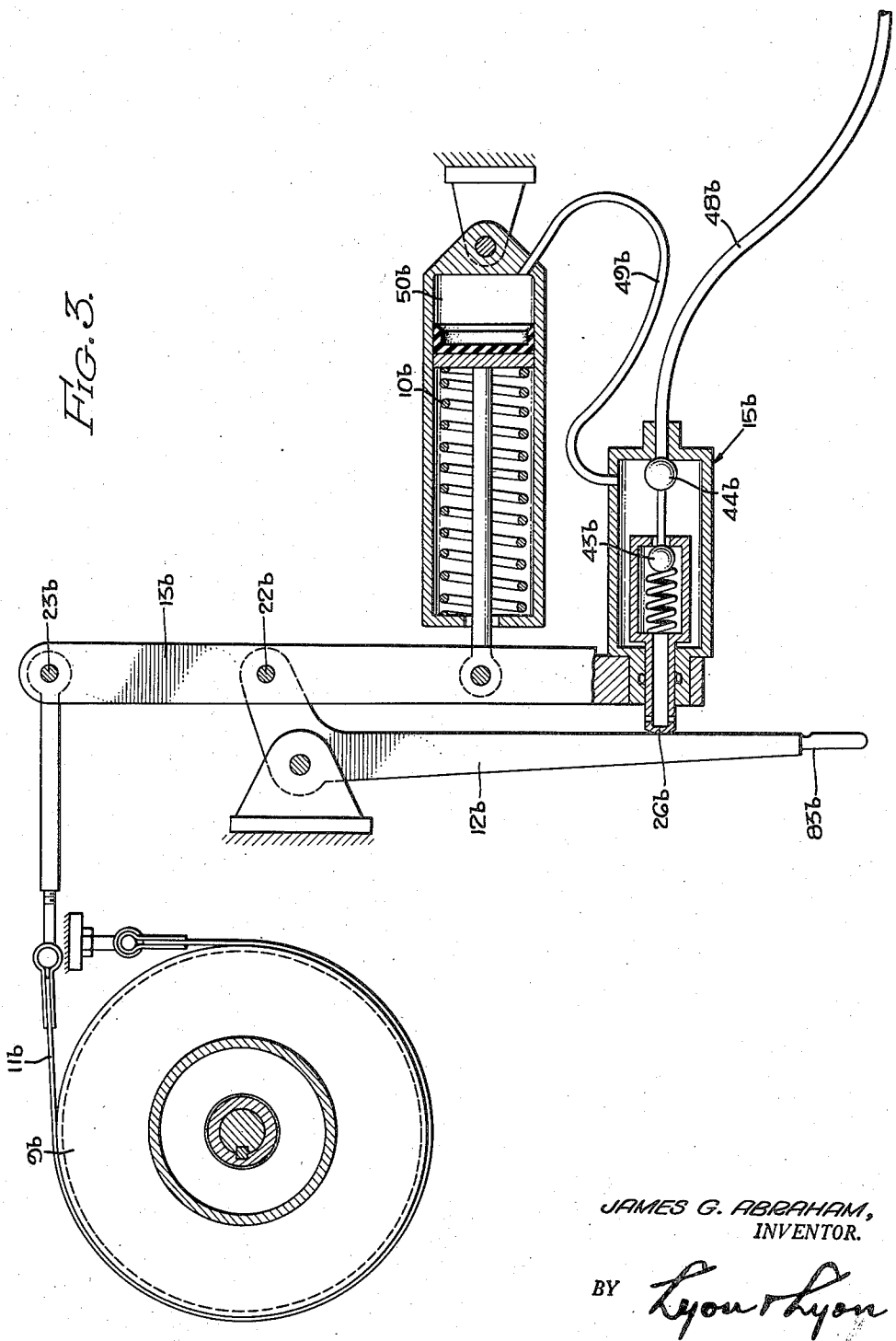

2,847,094

POWER OPERATED BRAKE FOR DRAWWORKS

James G. Abraham, Rolling Hills, Calif., assignor, by mesne assignments, to The National Supply Company, Pittsburgh, Pa., a corporation of Ohio Application March 15, 1954, Serial No. 416,167

5 Claims. (Cl. 188—151)

This invention relates generally to devices for amplifying power applied by an operating means, with proportional reproduction of both force and motion.

The invention is particularly directed to power booster apparatus for reducing the manual effort required to operate a load member but without loss of proportional response and force reaction, or "feel," at the manual lever. As a specific example, the invention will be described in connection with a power booster device for actuating a friction band brake, but this is by way of illustration only.

The Spalding Patent No. 2,282,615, granted May 12, 1942, shows a power operated device for actuating a friction band brake, but that device lacks an important feature of this invention in that the operator is not given a sense of feel or response to the degree of braking effort being accomplished. The work performed by the operator in moving the hand lever should bear a proportional relation to the total work performed as a consequence of his act, in order to preserve "feel" of the applied braking effort.

It is the principal object of this invention to provide a power booster mechanism for operating a load which permits the manual operating lever to apply proportional force and motion, and thereby preserve for the operator a sense of feel or response to the total force and motion applied.

A more specific object is to apply this principle to apparatus for operating a brake mechanism.

Another object is to provide such a device employing a pair of interconnected levers, one being connected to power means and to the load and the other being manually actuated, together with positioning means for maintaining the levers in substantially constant spatial relationship.

Another object is to provide a device of this type in which a spring acts in a direction to apply the brake and a fluid actuated device is employed to oppose the action of the spring.

Another object is to provide a device of this type in which a fluid actuated mechanism acts in a direction to apply the brake and is opposed by the action of a spring.

Other and more detailed objects and advantages will appear hereinafter.

In the drawings:

Figure 1 is a diagrammatic illustration of a preferred embodiment of my invention.

Figure 2 shows a modified form of my invention which permits the positioning valve assembly to be mounted in a stationary location.

Figure 3 shows a further modification in which a fluid pressure device acts in a direction to apply the brake against the action of a spring.

Referring to the drawings:

The preferred embodiment of my invention as shown in Figure 1 employs a compression spring 10 acting through a lever system to apply tension to the live end of the brake band 11. The lever system is pivotally mounted so that the swinging ends of the levers 12 and 13 have a motion proportional to the movement of the brake band 11 and a force reaction proportional to the tension in the band. An air cylinder assembly 14 acting in the direction to oppose the force of the spring 10 provides the means for releasing the brake. A positioning valve assembly 15 is provided which admits fluid under pressure to the cylinder assembly 14 or bleeds air therefrom to maintain the levers 12 and 13 in a substantially constant spatial relationship with each other. The force and motion imparted to the manual operating lever 16 is transmitted by any convenient means, such as hydraulic parts 17, 18 and 19, to the lever 12.

The secondary lever 12 is pivotally connected by means of pin 20 to the stationary support or bracket 21. The primary lever 13 constitutes a floating beam and is connected to the secondary lever by means of the pivot pin 22. The pivot pin 23 connects the primary lever 13 to the live end of the brake band 11. Th pivot pin 24 connects the primary lever 13 to the piston rod 25 of the assembly 14. The positioning valve assembly 15 is carried on one end of the primary lever 13, in this form of my invention. The movable projection 26 in the positioning valve assembly 15 contacts the secondary lever 12; and, as shown in Figure 1, the projection 26 and the piston rod 27 are preferably in axial alignment. The hydraulic part 19 includes a cylinder 28 pivotally mounted at 29 and containing piston 30. The piston rod 27 is fixed to the piston 30 and is pivotally connected to the secondary lever at 31. The hydraulic part 17 includes the stationary cylinder 32, the movable piston 33 and its piston rod 34. The operating lever 16 is pivotally mounted at 35 and includes slotted crank arm 36 which is connected to the piston rod 34 by means of pin 37.

The distance between the pivot pins 20 and 22 may be described as a "short arm" and the distance between the pivot pins 20 and 31 may be described as a "long arm." The floating beam 13 is therefore connected by pin 22 to the short arm of the lever 12 and the hydraulic part 19 is connected by pin 31 to the long arm of the lever 12.

The positioning valve assembly 15 includes the housing 38 which is fixed to the primary lever 13. A shell 39 is mounted within the housing 38 and carries the hollow projection 26 which is slidably received within the housing bore 40. A dumbbell valve element 41 includes a central shank 42 having a ball 43 fixed at one end and a ball 44 fixed at the other end. The shank 42 extends through an opening 45 in one end of the shell 39. A compression spring 46 acts to seat the ball 43 against the inner end of this opening 45. The ball 44 is adapted to seat on the inner end of the opening 47 in the housing. This opening 47 is connected to the pressure line 48.

The line 49 connects the interior of the housing 38 with the space 50 within the cylinder 51 of the assembly 14. This cylinder 51 is connected by pivot pin 52 to the stationary member 53. The piston 54 is mounted within the cylinder 51 and is connected to the piston rod 25. The coil spring 10 is confined between the piston 54 and one end 55 of the cylinder 51.

In normal operation, clockwise movement of the operating lever 16 serves to move the piston 33 to the left and thereby cause movement of the piston 30 to the right. The piston rod 27 acting through pin 31 moves the secondary lever 12 in a counterclockwise direction. This action causes the projection 26 to move toward the dumbbell valve element 41 thereby unseating the ball 43. Fluid pressure within the space 50 thereupon bleeds through line 49 into the interior of the housing 38 and passes through opening 45 into the shell 39. This fluid under pressure is then exhausted to atmosphere through the central opening 56 and lateral ports 57 in the projection 26. The reduction in unit pressure within the space 50 permits the spring 10 to expand and thereby tension the piston rod 25 and swing the primary lever 13 in a counterclockwise direction. This action tensions the brake band 11 to apply the brake. The greater the movement of operating lever 16 the greater the tension in the piston rod 25, and accordingly the greater the tension on the brake band 11.

When it is desired to release the brake to permit the brake drum 9 to turn under an applied torque load, the operating lever 16 is moved in a counterclockwise direction. This in turn allows the secondary lever to move in a clockwise direction. The projection 26 moves toward the left to maintain contact with the secondary lever 12, owing to the resultant end force applied to the shell 39 by the pressure within the housing 38. Movement of the projection 26 toward the left serves to unseat the ball 44 and thereby permit fluid under pressure to enter the interior of the housing 38 from the pressure line 48. The increase in pressure within the housing 38 is directed through line 49 into the space 50. This increase in pressure causes shortening of the spring 10 and reduction in tension in the piston rod 25. The primary lever moves in a clockwise direction thereby reducing the tension load on the brake band 11 and permitting the brake drum 9 to turn.

From this description it will be understood that the function of the positioning valve assembly 15 is to maintain the secondary lever 12 and primary lever 13 in substantially constant spatial relationship.

The form of my invention shown in Figure 1 has a "fail-safe" characteristic in that failure of fluid pressure in the pressure line 48 cannot result in relaxation of the brake band 11. The failure of pressure within the space 50 permits the spring 10 to apply the brake.

An emergency valve may be provided, if desired, in order to effect immediate application of the brake at any instant. This emergency valve is generally designated 58 and includes a stationary cylinder 59 having a balanced piston valve 60 therein. The emergency lever 61 is pivotally mounted at 62 and carries a slotted arm 63. A pin 64 connects this slotted arm to the balanced piston valve 60. An exhaust valve assembly 65 includes a stationary cylinder 66 having a piston valve 67 slidably mounted therein. This piston valve 67 is connected by means of the rod 68 to the balanced piston valve 60. When the emergency lever 61 is moved to the position shown in Figure 1, fluid under pressure is permitted to flow into the line 48 from the supply pipe 69. At the same time the piston valve 67 closes off the exhaust line 70 which is connected to the cylinder 51 and space 50. When the emergency lever 61 is shifted in a counterclockwise direction, as viewed in Figure 1, the balanced piston valve 60 cuts off communication between the supply 69 and line 48, and at the same time the piston valve 67 moves to the right so that the exhaust line 70 is vented to atmosphere through opening 71. The pressure within the space 50 is thus exhausted to atmosphere permitting the coil spring 10 to move the primary lever 13 in a direction to apply the brake.

The force and motion applied to the brake band 11 are proportional to the force and motion respectively applied to the operating lever 16. Thus the force applied to the operating lever 16 is effective to apply a proportional force to the primary lever or floating beam 13. Similarly, the extent of motion of the manual operating lever 16 is proportional to the motion of the connecting pin 23 since the movement of the swinging end of the secondary lever 12 is proportional and since the spacing of the levers 12 and 13 is preserved by means of the positioning valve assembly 15. A sense of "feel" is therefore provided for the operator in applying the brake.

The modified form of my invention, as shown in Figure 2, is similar in many respects to the preferred form shown in Figure 1, but it has certain important differences. The positioning valve assembly generally designated 15a is not mounted on one of the swinging levers, but on the contrary is fixed in a stationary location. The projection 26a engages one end of a pivoted arm 80 which is connected to the primary lever 13a by means of pivot pin 81. The other end of the arm 80 is pivotally connected by link 82 to the secondary lever 12a In this form of my invention, I have shown a manual operating handle 83 fixed to the swinging end of the secondary lever 12a. It will be recognized that the hydraulic parts 17, 18, and 19, as shown in Figure 1, may be substituted for this handle 83, if desired. The power cylinder assembly 14a and the assembly 58 are of substantially the same construction as previously described, but the emergency valve assembly 58 is positioned between the assembly 15a and the power cylinder assembly 14a instead of being positioned in the supply line 48a. The floating beam 13a is mounted on the short arm of the lever 12a, and the manual force is applied at the end of the long arm of the lever 12a at 83.

The operation of this modified form of my invention, as shown in Figure 2, is substantially the same as previously described. Movement of the operating handle 83 in a counter-clockwise direction causes the projection 26a to be depressed, thereby unseating ball 43a with consequent reduction in pressure in the space 50a. This allows the coil spring 10a to move the primary lever or floating beam 13a in a direction to apply the brake. Movement of the operating handle 83 in a clockwise direction serves to unseat the ball 44a and thereby allow fluid under pressure from the supply line 48a to pass through line 49a and increase the unit pressure within the space 50a. This contracts the spring 10a and moves the primary lever 13a in a direction to release the brake.

The second modification, as shown in Figure 3, differs primarily from the two forms of my invention previously described in that the fluid pressure is used to apply the brake while the opposing spring acts to release the brake. The positioning valve assembly 15b is carried on one end of the primary lever or floating beam 13b. The pivot connection 23b for the brake band is located at the other end of the primary lever 13b. The pivotal connection 22b between the primary lever 13b and the secondary lever 12b is located between the ends of the primary lever 13b, and at the end of the short arm of the lever 12b. When the operating handle 83b at the end of the long arm of the lever 12b is swung in a counterclockwise direction, the projection 26b is moved to cause unseating of the ball 43b. The pressure in the space 50b is then reduced by reason of venting through line 49b, as described above. The spring 10b then acts to release the brake by swinging the primary lever 13b in a counter-clockwise direction about the pivot pin 22b. If the operating handle 83b is moved in a clockwise direction, the projection 26b moves to the left and thereby unseats the ball 44b to permit fluid pressure from the line 48b to pass through line 49b and increase the unit pressure within the space 50b. This serves to compress the spring 10b and thereby swing the primary lever 13b about the pivot pin 22b in a direction to apply the brake.

In both of the modified forms of my invention, as shown in Figures 2 and 3 of the drawings, it will be understood that the function of the positioning valve assembly is to maintain the spatial relationship of the primary and secondary levers. The proportional response of both force and motion is present in both of these modified forms of my invention and a sense of "feel" is thereby provided for the operator in applying the brake.

Having fully described my invention, it is to be understood that I do not wish to be limited to the details herein set forth, but my invention is of the full scope of the appended claims.

I claim:

1. Apparatus for tensioning a brake band about a brake drum, comprising in combination: a lever having a fixed pivotal support and provided with a short arm and a long arm, a floating beam pivotally supported upon the short arm, means for applying an operating force to the lever at the end of the long arm thereof, means for connecting the brake band to the floating beam, a spring operatively connected to move the floating beam in one direction about said pivot means, a fluid-actuated device opposing the action of the spring, means for energizing the fluid-actuated device to compress the spring and thereby move said floating beam in the other direction about said pivot means, said energizing means including a valve assembly having a housing and a relatively movable valve part therein, means connected to the valve assembly responsive to relative pivotal movement of the lever and floating beam to move the valve part relative to the housing, a conduit connecting the valve assembly with said fluid-actuated device, a conduit adapted for supplying the valve assembly with fluid under presssure, the valve assembly being adapted to vent the fluid-actuated device upon any relative pivotal movement of the lever and floating beam in one direction, and to pressurize the fluid-actuated device upon any relative pivotal movement of the lever and floating beam in the other direction.

2. Apparatus for tensioning a brake band about a brake drum, comprising in combination: a lever having a fixed pivotal support and provided with a short arm and a long arm, a floating beam pivotally supported upon the short arm, means for applying an operating force to the lever at the end of the long arm thereof, means for connecting the brake band to the floating beam, a spring operatively connected to move the floating beam in a direction to tension the brake band, a fluid-actuated device opposing the action of the spring, means for energizing the fluid-actuated device to compress the spring and thereby reduce the force applied to said floating beam, said energizing means including a valve assembly having a housing and a relatively movable valve part therein, means connected to the valve assembly responsive to relative pivotal movement of the lever and floating beam to move the valve part relative to the housing, a conduit connecting the valve assembly with said fluid-actuated device, a conduit adapted for supplying the valve assembly with fluid under pressure, the valve assembly being adapted to vent the fluid-actuated device upon any relative pivotal movement of the lever and floating beam in one direction, and to pressurize the fluid-actuated device upon any relative pivotal movement of the lever and floating beam in the other direction.

3. Apparatus for tensioning a brake band about a brake drum, comprising in combination: a lever having a fixed pivotal support and provided with a short arm and a long arm, a floating beam pivotally supported upon the short arm, means for applying an operating force to the lever at the end of the long arm thereof, means for connecting the brake band to the floating beam, a spring operatively connected to move the floating beam in a direction to tension the brake band, a fluid-actuated device opposing the action of the spring, means for energizing the fluid-actuated device to compress the spring and thereby reduce the force applied to said floating beam, said energizing means including a valve assembly having a housing mounted on the floating beam and having a relatively movable valve part therein, means whereby said valve part is actuated by said lever, a conduit connecting the valve assembly with said fluid-actuated device, a conduit adapted for supplying the valve assembly with fluid under pressure, the valve assembly being adapted to vent the fluid-actuated device upon any relative pivotal movement of the lever and floating beam in one direction, and to pressurize the fluid-actuated device upon any relative pivotal movement of the lever and floating beam in the other direction.

4. Apparatus for tensioning a brake band about a brake drum, comprising in combination: a lever having a fixed pivotal support and provided with a short arm and a long arm, a floating beam pivotally supported upon the short arm, means for applying an operating force to the lever at the end of the long arm thereof, means for connecting the brake band to the floating beam, a spring operatively connected to move the floating beam in a direction to tension the brake band, a fluid-actuated device opposing the action of the spring, means for energizing the fluid-actuated device to compress the spring and thereby reduce the force applied to said floating beam, said energizing means including a valve assembly having a stationary housing having a movable part therein, a member pivotally mounted on the floating beam having one end engaging the said movable valve part and the other end link-connected to said lever, a conduit connecting the valve assembly with said fluid-actuated device, a conduit adapted for supplying the valve assembly with fluid under pressure, the valve assembly being adapted to vent the fluid-actuated device upon any relative pivotal movement of the lever and floating beam in one direction, and to pressurize the fluid-actuated device upon any relative pivotal movement of the lever and floating beam in the other direction.

5. Apparatus for tensioning a brake band about a brake drum, comprising in combination: a lever having a fixed pivotal support and provided with a short arm and a long arm, a floating beam pivotally supported upon the short arm, means for applying an operating force to the lever at the end of the long arm thereof, means for connecting the brake band to the floating beam, a spring operatively connected to move the floating beam in a direction to relax the brake band, a fluid-actuated device opposing the action of the spring, means for energizing the fluid-actuated device to compress the spring and thereby increase the force applied to said floating beam, said energizing means including a valve assembly having a housing mounted on the floating beam and a relatively movable valve part therein, means whereby said valve part is actuated by said lever, a conduit connecting the valve assembly with said fluid-actuated device, a conduit adapted for supplying the valve assembly with fluid under pressure, the valve assembly being adapted to vent the fluid-actuated device upon any relative pivotal movement of the lever and floating beam in one direction, and to pressurize the fluid-actuated device upon any relative pivotal movement of the lever and floating beam in the other direction.

References Cited in the file of this patent

UNITED STATES PATENTS

| | | |
|---|---|---|
| 1,812,463 | Berry | June 30, 1931 |
| 1,844,457 | Berry | Feb. 9, 1932 |
| 1,882,544 | Bragg et al. | Oct. 11, 1932 |
| 1,897,787 | Berry | Feb. 14, 1933 |
| 1,905,984 | Hill | Apr. 25, 1933 |
| 2,063,700 | Searle | Dec. 8, 1936 |
| 2,141,697 | Russell | Dec. 27, 1938 |
| 2,215,423 | Heftler | Sept. 17, 1940 |
| 2,265,546 | Price | Dec. 9, 1941 |
| 2,270,431 | Freeman | Jan. 20, 1942 |
| 2,282,615 | Spalding | May 12, 1942 |

FOREIGN PATENTS

| | | |
|---|---|---|
| 742,236 | France | Dec. 27, 1932 |
| 522,647 | Germany | Apr. 18, 1931 |